United States Patent

Abe et al.

[11] Patent Number: 5,746,174
[45] Date of Patent: May 5, 1998

[54] DIAGNOSTIC SYSTEM FOR PRESSURE SWITCH

[75] Inventors: Hiroshi Abe, Yokosuka; Osamu Matsuno, Ebina, both of Japan

[73] Assignee: Nissan Motor Co., Ltd., Yokohama, Japan

[21] Appl. No.: 762,999

[22] Filed: Dec. 10, 1996

[30] Foreign Application Priority Data

Dec. 27, 1995 [JP] Japan .................................. 7-341908

[51] Int. Cl.[6] .............................. F02D 45/00; G01M 9/00
[52] U.S. Cl. ...................... 123/306; 73/118.1; 123/339.15
[58] Field of Search ................................ 123/306, 198 D, 123/339.15, 339.28; 73/118.1, 117.3

[56] References Cited

U.S. PATENT DOCUMENTS

| | | |
|---|---|---|
| 4,616,615 | 10/1986 | Kawaguchi et al. ............... 123/339.15 |
| 4,704,996 | 11/1987 | Morikawa ............................ 123/306 |
| 4,750,461 | 6/1988 | Hasebe et al. ...................... 123/339.28 |
| 5,046,467 | 9/1991 | Arnold et al. ...................... 123/339.15 |

FOREIGN PATENT DOCUMENTS 62-55443  3/1987  Japan .
62-135653  6/1987  Japan .

*Primary Examiner*—Thomas N. Moulis
*Attorney, Agent, or Firm*—Foley & Lardner

[57] ABSTRACT

A diagnostic system is arranged to detect a malfunction in a pressure switch for sensing a negative pressure in a passage between an actuator and a selector valve for alternately introducing a negative pressure such as an intake manifold vacuum and an atmospheric pressure to the actuator to control the actuator. The diagnostic system has a section for carrying out a diagnostic operation on the pressure switch during engine operation, and a section for carrying out a similar diagnostic operation to check the pressure switch after a stop of the engine while holding a power supply for the diagnosis.

13 Claims, 5 Drawing Sheets

DIAGNOSTIC SYSTEM FOR PRESSURE SWITCH

BACKGROUND OF THE INVENTION

The present invention relates to a diagnostic system for a pressure sensing device, and more specifically a system for performing diagnosis on a device for sensing a vacuum (or negative pressure) in a passage between an actuator having a vacuum chamber for receiving an intake vacuum of an engine and a selector valve for selectively introducing the intake vacuum or the atmospheric pressure to the working chamber of the actuator.

The pressure sensing device such as a pressure switch is provided to check whether the pressure supplied to the actuator is correctly controlled, and the diagnosis on the pressure switch is required to improve the reliability of the system.

Japanese Patent Provisional Publications Nos. 62-55443, and 62-135653 show conventional examples of the diagnostic system.

However, the conventional diagnostic systems are arranged to carry out diagnostic operations while the engine is in operation, and accordingly the opportunity for the diagnosis is limited specifically in a duty factor control system supplying the atmospheric pressure and the intake vacuum alternately at short time intervals. When, for example, a diagnostic system is arranged to monitor the signal of the pressure sensing device in the mode introducing the atmospheric pressure to the actuator, and to check whether the signal of the pressure sensing device is in the signal state indicating the detection of the atmospheric pressure, the diagnostic system may have no chance to conduct the diagnosis because the period holding the atmospheric pressure introducing mode is too short.

SUMMARY OF THE INVENTION

It is therefore an object of the present invention to provide a diagnostic system capable of performing a diagnosis on a pressure sensing device reliably.

According to the present invention, a diagnostic system comprises an actuator, an intake vacuum introducing means, a selector valve, a pressure sensing device such as a pressure switch, and a controlling means.

The actuator has at least a vacuum chamber for receiving an intake vacuum of an engine.

The intake vacuum introducing means for introducing the intake vacuum to the vacuum chamber of the actuator.

The selector valve is connected with the vacuum chamber of the actuator by a vacuum control passage. The selector valve has at least a first selector valve state for introducing the intake vacuum from the intake vacuum introducing means to the vacuum chamber of the actuator through the control passage, and a second selector valve state for introducing an atmospheric pressure to the vacuum chamber through the control passage;

The pressure sensing device is responsive to the pressure in the control passage between the selector valve and the vacuum chamber of the actuator, and produces a pressure signal which is in an atmospheric pressure detection signal state when the pressure in said control passage is higher than a predetermined pressure value.

The controlling means is arranged to produce a diagnostic signal which is in a normality judgment state indicative of normality of the pressure sensing device when the pressure signal in the atmospheric pressure detection state is produced by the pressure sensing device within a predetermined allowable time from a stop of the engine, and in an abnormality judgment state indicative of abnormality of the pressure sensing device when the pressure signal in the atmospheric pressure detection state is not produced by the pressure sensing device within the allowable time, to maintain supply of electric power to the controlling means after a stop of the engine, and to shut off the supply after generation of the diagnostic signal.

Figure 1:
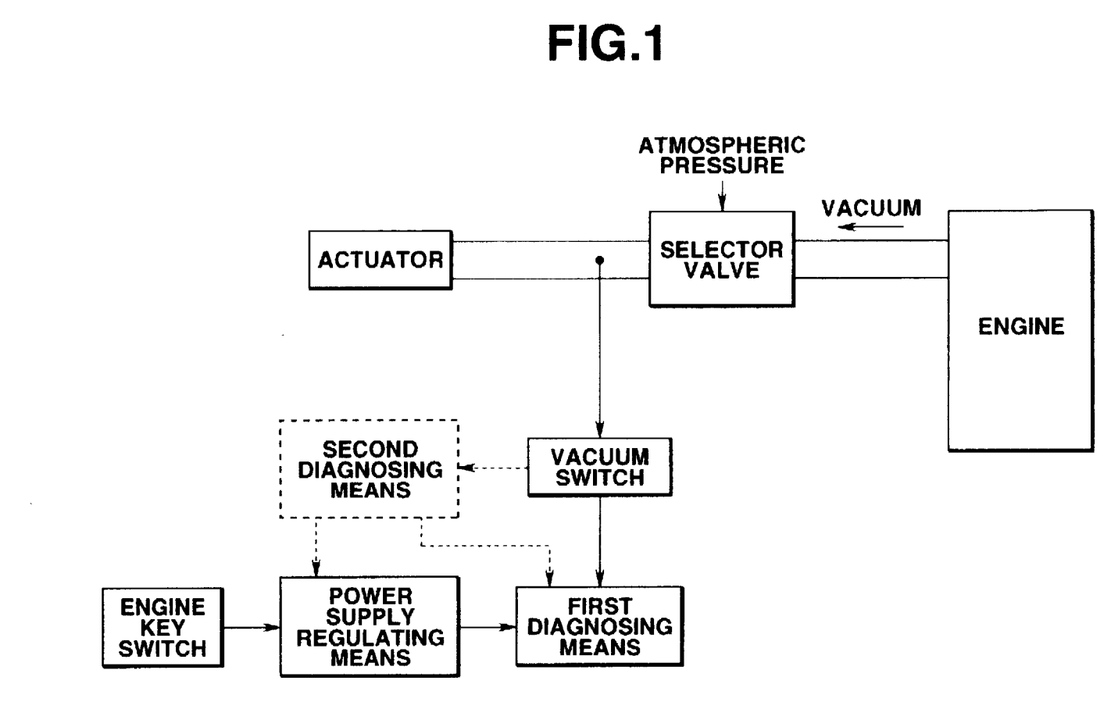
FIG. 1 is a block diagram showing, as an example, an arrangement of various means which can be employed in the present invention.

In an example shown in FIG. 1, the controlling means includes at least a first diagnosing means for producing the diagnostic signal by monitoring the pressure signal from the pressure sensing device in the form of a pressure switch after a stop of said engine, and a power supply regulating means for holding the supply of electric power to the controlling means after the stop of the engine and shutting off the supply after the generation of the diagnostic signal by the first diagnosing means. The controlling means may further include a second diagnosing means for producing the diagnostic signal in accordance with the pressure signal while the engine is in operation, and for enabling the diagnosis of the first diagnostic means only when the diagnosis of the second diagnosing means is not finished.

DETAILED DESCRIPTION OF THE INVENTION

Figure 2:
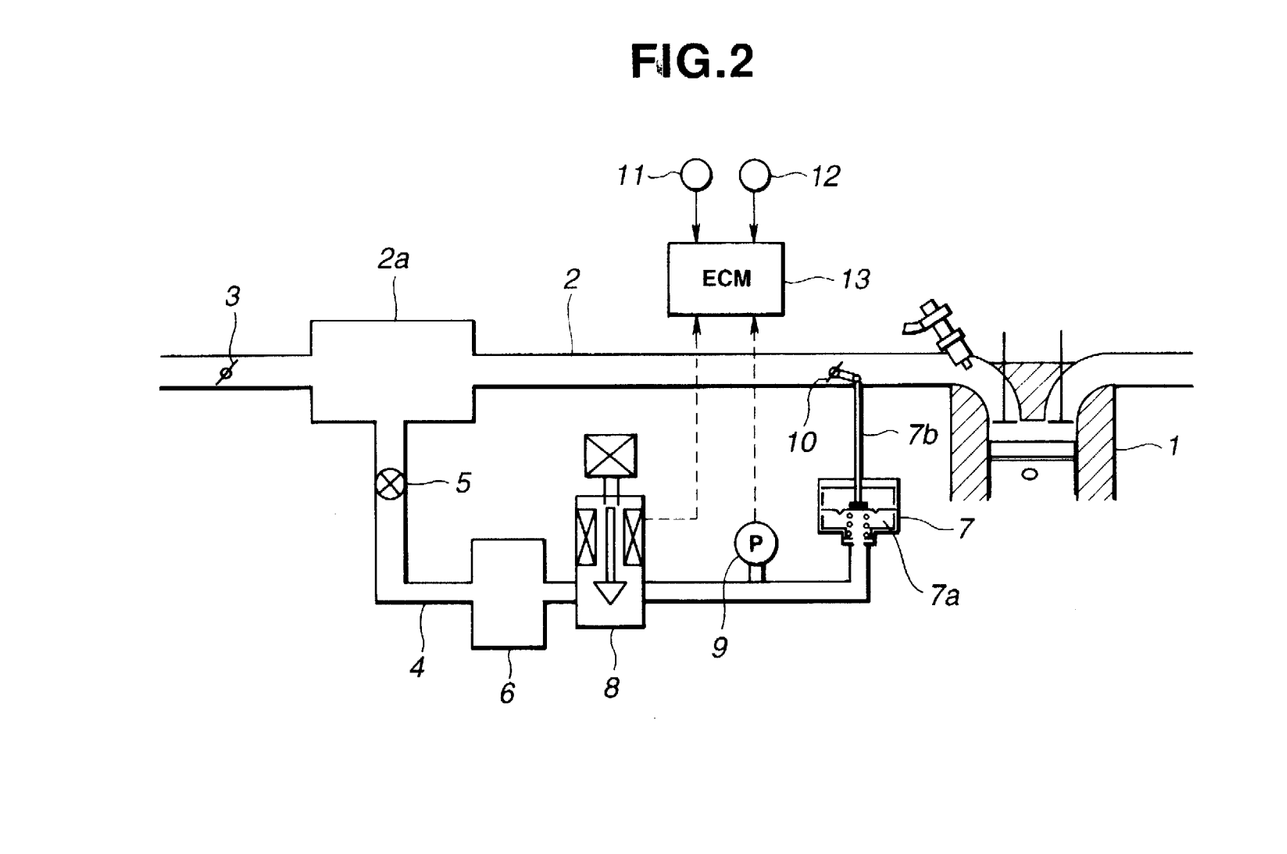
FIG. 2 is a schematic view showing a system according to one embodiment of the present invention.

FIG. 2 shows a diagnostic system according to one embodiment of the present invention.

A throttle valve 3 is disposed in an intake passage 2 to an engine 1. The intake passage 2 has a collector section 2a on the downstream side of the throttle valve 3. One end of a vacuum passage 4 is connected to the collector section 2a of the intake passage 2.

The vacuum passage 4 connects the collector section 4a of the intake passage 4, through a one way valve 5 and a vacuum tank 6, to a pressure working chamber 7a of an actuator 7. The vacuum passage 4 can introduce an intake vacuum developed in the collector section 2a, to the working chamber 7a of the actuator 7. In the vacuum passage 4, there are further provided a selector valve 8 and a pressure sensing device 9 between the vacuum tank 6 and the actuator 7. In this example, the pressure sensing device 9 is a pressure switch (or vacuum switch).

The one way valve (or check valve) 5 is disposed between the collector section 2a and the vacuum tank 6, and arranged to allow an air flow only in a direction from the vacuum tank 6 to the collector section 2a of the intake passage 2. In other words, the one way valve 5 limits the transmission of the vacuum to a single direction from the collector section 2a to the vacuum tank 6.

The selector valve 8 of this example is a three way solenoid valve. The selector valve 8 has a valve element movable between a first state for introducing the vacuum from the vacuum tank 6 to the working chamber 7a of the actuator 7 by making fluid communication therebetween, and a second state for introducing an atmospheric pressure by opening the pressure working chamber 7a to the atmosphere.

Figure 4:
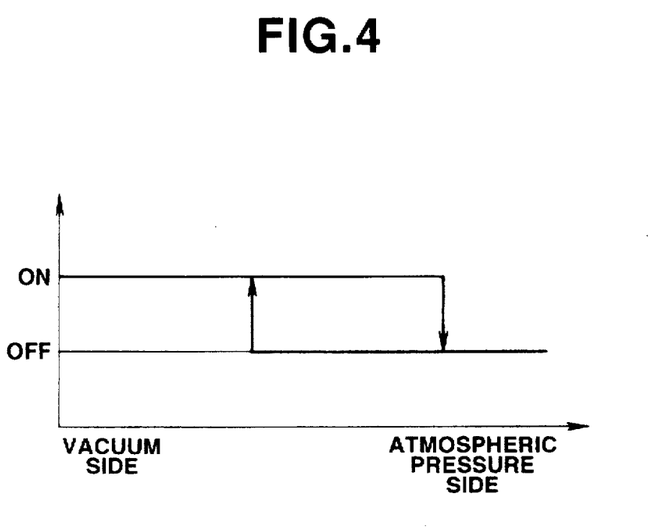
FIG. 4 is a graph showing a characteristic of a pressure switch used in the system of FIG. 2.

The pressure switch 9 is responsive to the pressure in the vacuum passage section (or vacuum control passage) between the selector valve 8 and the working chamber 7a of the actuator 7. The pressure switch 9 is in the on state when the sensed pressure is on the atmospheric pressure's side of a predetermined negative pressure, and in the off state when the sensed pressure is on the vacuum's side of the predetermined negative pressure. In this example, the pressure switch 9 is arranged to have a hysteresis as shown in FIG. 4 to prevent hunting.

The actuator 7 of this example is connected with a swirl control valve 10 for controlling induction swirl by throttling a part of the intake passage 2. The swirl control valve 10 is disposed in an intake port downstream of the collector section 2a. The swirl control valve 10 is liked with an end of an output rod 7b of the actuator 7. The selector valve 8 is operated intermittently between the first and second valve states at a controlled duty ratio to control the pressure supplied to the working chamber 7a of the actuator 7. In accordance with the supplied pressure, the actuator 7 varies the amount of stroke of the output rod 7b, and the swirl control valve 10 varies the amount of throttling. In this way, the actuator 7 can control the occurrence of induction swirl by controlling the swirl control valve 10.

There are further provided an engine key switch 11, and an engine speed sensor 12 for sensing a rotational speed of the engine 1. The signals of these components 11 and 12 are supplied to a control unit 13.

The control unit 13 is arranged to detect an engine operating condition, and controls the induction swirl by sending a selector valve control signal to the selector valve 8 in accordance with the engine operating condition. Furthermore, the control unit 13 performs diagnostic operations to check the pressure switch 9.

Figure 3:
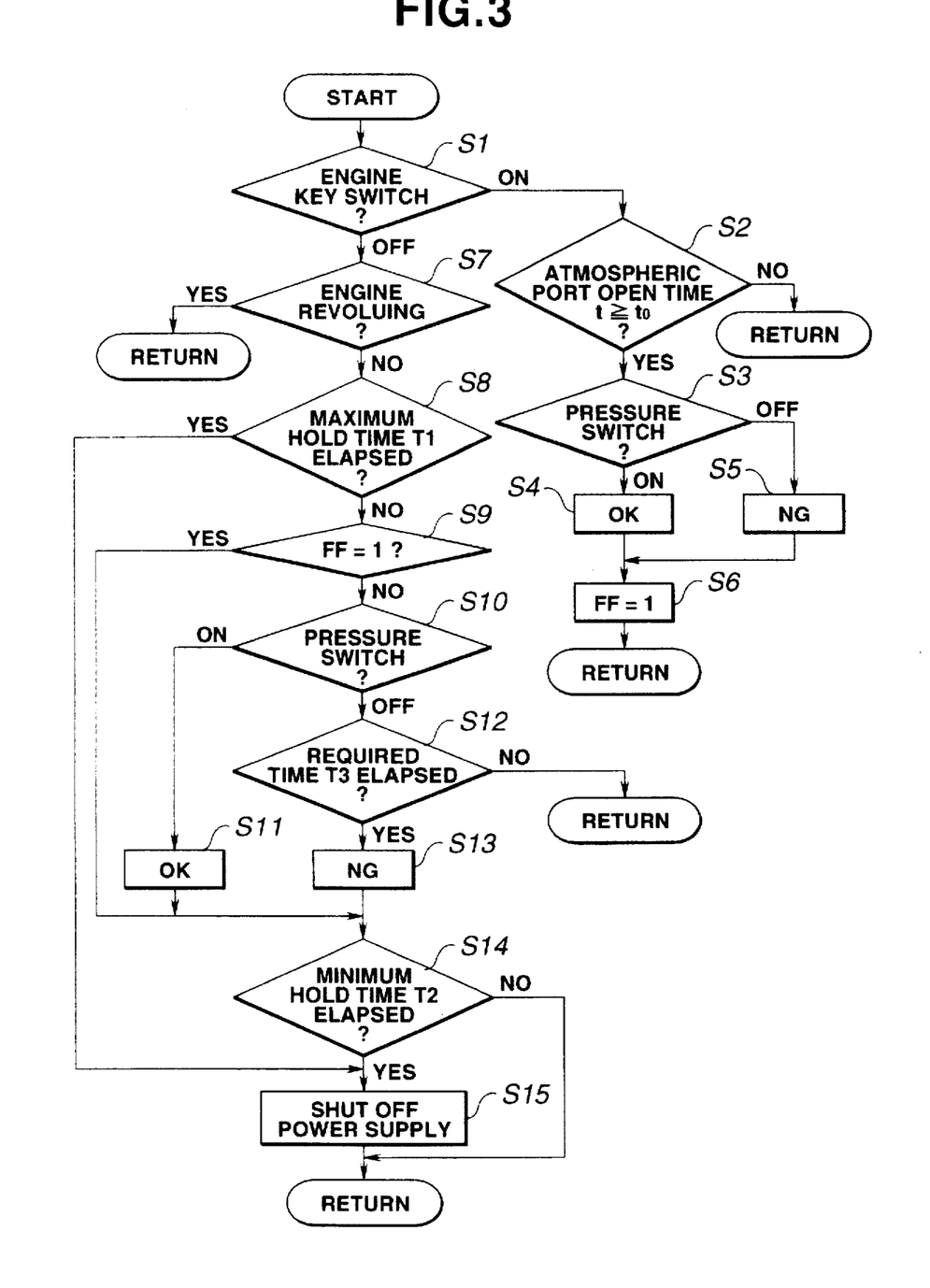
FIG. 3 is a flow chart showing a pressure switch diagnosis routine performed by a control unit of the system shown in FIG. 2.

FIG. 3 shows a diagnostic routine that the control unit 13 performs to examine the pressure switch 9.

At a step S1, the control unit 13 determines whether the engine key switch 11 is in the on state or the off state. If it is on, then the control unit 13 proceeds to a step S2, and determines at the step S2 whether an open time t of the selector valve 8 has reached a predetermined time t0, or not. The open time is a duration during which the selector valve 8 is held in the second state for opening the working chamber 7a to the atmosphere by opening an atmospheric pressure port of the selector valve 8.

If the valve open time t is equal to or greater than the predetermined time t0, then the control unit 13 proceeds to a step S3, and determines at the step S3 whether the pressure switch 9 is in the on state or not. If the pressure switch 9 is on, then the control unit 13 proceeds to a step S4, and judges that the pressure switch 9 is normal (OK). If the pressure switch 9 is off, then the control unit 13 proceeds to a step S5 and judges that the pressure switch 9 may be abnormal (NG).

Then, the control unit 13 proceeds from the step S4 or S5 to a step S6, and sets a diagnosis completion flag FF to 1 to indicate that the diagnosis is finished.

When the engine key switch 10 is off, the control unit 13 proceeds from the step S1 to a step S7, and determines at the step S7 whether the engine 1 is revolving or not.

When the engine 1 is stopped, the control unit 13 proceeds to a step S8, and determines at the step S8 whether a predetermined maximum hold time T1 has elapsed from the stop of the engine 1. Normally, this diagnostic system completes the diagnostic operation and shuts off the power supply to the control unit 13 before expiration of the maximum hold time T1. Even if the power supply is not shut off in the normal manner for some reason, the diagnostic system proceeds to a step S15 and shuts off the power supply securely at the end of the maximum hold time T1.

When the elapsed time from the stop of the engine is shorter than the maximum hold time T1, the control unit 13 proceeds to a step S9 and determines at the step S9 whether the diagnostic completion flag FF is set equal to one or not.

When the diagnosis is finished at the steps S2~S5 during the operation of the engine 1, and hence the flag FF is set to one at the step S6, the control unit 13 jumps from the step S9 to a step S14, and determines at the step S14 whether or not a predetermined minimum hold time T2 has elapsed from the stop of revolution of the engine 1. Even if the diagnosis on the pressure switch 9 is already finished, the diagnostic system of this example maintains the power supply to the control unit 13 for the minimum hold time T2. At the end of the minimum hold time T2, the control unit 13 shuts off the power supply at the step S15.

The minimum hold time T2 is a minimum time interval required to sufficiently reduce the influence of the power cutoff to the control unit 13 after the stop of the engine. The minimum hold time T2 is sufficiently shorter than the before-mentioned maximum hold time T1, and sufficiently shorter than an after-mentioned time T3.

When the diagnosis is not finished during the engine operation, and the flag FF is not one, then the control unit 13 proceeds from the step S9 to a step S10, and checks the pressure switch 9. At the step S10, the control unit 13 determines whether the pressure switch 9 is in the on state or not. When the pressure switch 9 is in the on state, the control unit 13 proceeds to a step S11, and judges that the pressure switch 9 is normal (OK). When the pressure switch 9 is in the off state, the control unit 13 proceeds to a step S12, and determines at the step S12 whether a predetermined required time (allowable time) T3 for judgment has elapsed or not.

The required time T3 is longer than a time required for the vacuum to escape through the vacuum passage 4 and the selector valve 8 after the switching operation of the selector valve 8 to the mode for opening to the atmospheric pressure after the stop of the engine, and for the pressure switch 9 to detect the atmospheric pressure and to turn on. The required time T3 is set to a relatively long time so that the pressure switch 9 can detect the increase of the pressure in a stable manner. Assuming the abnormal case in which the selector valve 8 is not switched to the atmospheric open side after the stop of the engine 1, it is possible to set the required time T3 equal to or longer than the time required for the vacuum in the vacuum tank 9 to escape gradually through clearances in the one way valve 5, the selector valve 8 etc., to the atmosphere to further improve the reliability of the diagnosis.

When the pressure switch 9 remains off after the expiration of the required time T3, the control unit 13 proceeds to a step S13 and judges that the pressure switch 9 may be out of the normal condition (NG).

The steps S10, S11 and S13 correspond to the first (or after-stop) diagnosing means shown in FIG. 1.

After the step S11 or S13, the control unit 13 proceeds to the step S14 and determines whether the elapsed time from the stop of the engine is equal to or longer than the minimum hold time T2. In the case where the result of the diagnosis is NG, the minimum hold time T2 has already elapsed because the required time T3 is sufficiently longer than the minimum hold time T2. On the other hand, the result of the diagnosis is OK, the step S14 may be reached before expiration of the minimum hold time T2. In this case, the control unit 13 waits until the expiration of the minimum hold time T2, and then shuts off the power supply to the control unit 13 at the step S15.

Thus, the diagnostic system of this example holds the power supply to the control unit 13 in the turn-on state after the stop of the engine for the time determined by the step S12 or the step S14. These functions correspond to the power supply regulating means shown in FIG. 1.

The steps S2–S5 for carrying out the diagnosis during the operation of the engine 1 correspond to the second diagnosing means shown in FIG. 1.

Figure 5:
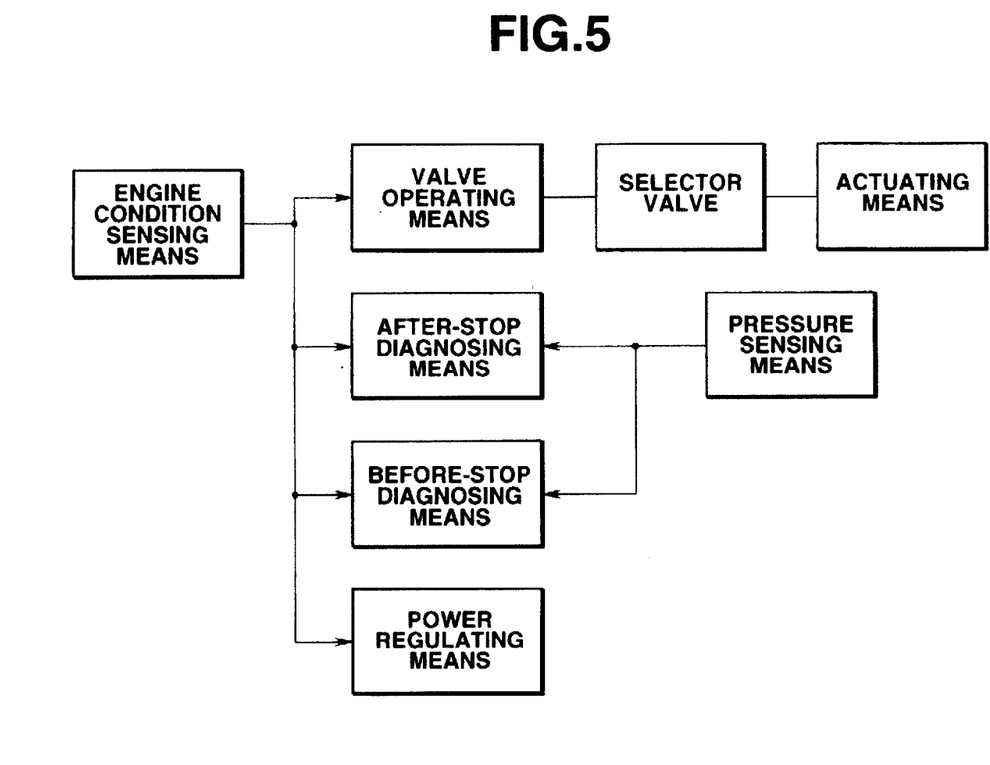
FIG. 5 is a block diagram showing, as an example, an arrangement of various means used in the illustrated embodiment of the present invention.

FIG. 5 shows an arrangement of various means according to the illustrated embodiment of the present invention. A system shown in FIG. 5 is an engine control system or a vehicle control system mounted on a vehicle.

The control system shown in FIG. 5 has, as sensing means, a pressure sensing means (9) for sensing a pressure in a vacuum control passage between a selector valve and a working chamber of a vacuum actuator operated by an intake manifold vacuum, and producing a pressure signal which is in an atmospheric pressure detecting signal state (such as an on state) when the pressure in the control passage is equal to or higher than a predetermined pressure level, and a vacuum pressure detecting state (such as an off state) when the pressure in the control passage is lower than the predetermined pressure level; and an engine condition sensing means (11, 12) for sensing one or more engine operating conditions of the engine system, and producing an engine rest signal when the engine is in a predetermined rest state, and an engine run signal when said engine is in a revolving state. The pressure sensing means may comprise a pressure sensing device which turns on when the pressure increases beyond a predetermined higher pressure level, and turns off when the pressure decreases beyond a predetermined lower pressure level lower than the higher pressure level.

The control system shown in FIG. 5 further has a controlling means for generating a valve open command signal to hold the selector valve in the atmospheric pressure introducing valve state upon receipt of the engine rest signal from the engine condition sensing means, producing a first malfunction signal (an NG signal) if the pressure signal from the pressure sensing device remains in the vacuum detecting state for a predetermined allowable time after generation of the valve open command signal, and maintaining supply of electric power to the control system for a limited time duration after receipt of the engine rest signal. The controlling means comprises:

a power regulating means (S8, S9, S14, S15) for holding a power supply to the control system in an on state from receipt of the engine rest signal for the limited time duration which is equal to or longer than a predetermined minimum hold time (T2) and which is equal to or shorter than a predetermined maximum hold time (T1);

an after-stop (first) diagnosing means (S10–S13) for producing the first malfunction signal when the pressure signal remains continuously in the vacuum detecting state for the allowable time (T3) after receipt of the engine rest signal; and a before-stop (second) diagnosing means (S2–S6) for producing a second malfunction signal when the pressure signal remains continuously in the vacuum detecting state for a predetermined valve opening duration (t0) during which the selector valve is held in the atmospheric pressure.

What is claimed is:

1. A diagnostic system comprising:

an actuator comprising a vacuum working chamber for receiving an intake vacuum of an engine;

an intake vacuum introducing means for introducing the intake vacuum to said working chamber of said actuator;

a selector valve connected with said working chamber of said actuator by a vacuum control passage, said selector valve comprising a vacuum introducing valve state for introducing the intake vacuum from said intake vacuum introducing means to said working chamber through said control passage, and an atmospheric pressure introducing valve state for introducing an atmospheric pressure to said working chamber through said control passage;

a pressure sensing device for sensing a pressure in said control passage between said selector valve and said working chamber of said actuator, and producing a pressure signal which is in an atmospheric pressure detection signal state when the pressure in said control passage is higher than a predetermined pressure value; and a controlling means for producing a diagnostic signal which is in a normality judgment state indicating normality of said pressure sensing device when said pressure signal in said atmospheric pressure detection state is produced by said pressure sensing device within a predetermined allowable time from a stop of the engine, and in an abnormality judgment state indicating abnormality of said pressure sensing device when said pressure signal in said atmospheric pressure detection state is not produced by said pressure sensing device within said allowable time, maintaining supply of electric power to said controlling means after a stop of the engine, and shutting off the supply after generation of said diagnostic signal.

2. A diagnostic system as claimed in claim 1 wherein said controlling means comprises a valve operating means for switching said selector valve to said atmospheric pressure introducing valve state for introducing the atmospheric pressure when the engine is stopped, a first diagnosing means for producing said diagnostic signal by monitoring said pressure signal from said pressure sensing device after a stop of said engine, and a power regulating means for holding the supply of electric power to said controlling means after the stop of the engine and shutting off the supply after the generation of said diagnostic signal by said first diagnosing means.

3. A diagnostic system as claimed in claim 2 wherein said controlling means further comprises a second diagnosing means for producing said diagnostic signal in accordance with the pressure signal from the pressure sensing device during an engine operation, for allowing said first diagnosing means to perform a diagnostic operation only when a diagnostic operation of said second diagnosing means is not finished, and for causing said power regulating means to shut off the supply of electric power after a stop of the engine without regard to generation of said diagnostic signal by said first diagnosing means when the diagnostic operation of said second diagnosing means is finished.

4. A diagnostic system as claimed in claim 3 wherein said power regulating means includes a means for preventing the supply of electric power to said controlling means from being shut off until expiration of a predetermined minimum hold time from a stop of the engine, and said minimum hold time is shorter than said allowable time.

5. A diagnostic system as claimed in claim 4 wherein said power regulating means includes a means for shutting off the supply of electric power to said controlling means at an end of a predetermined maximum hold time after a stop of the engine, and said maximum hold time is longer than said allowable time.

6. A diagnostic system as claimed in claim 5 wherein said second diagnosing means includes a means for checking said pressure signal from said pressure sensing device only when the engine is in operation and a time duration during which said selector valve remains in said atmospheric pressure introducing valve state is equal to or longer than a predetermined time, for producing said diagnostic signal in said normality judgment state indicative of the normality of said pressure sensing device when said pressure sensing device is in said atmospheric pressure detection state, for producing said diagnostic signal in said abnormality judgment state indicative of the abnormality of said pressure sensing device when said pressure signal is out of said atmospheric pressure detection state, and for producing a before-stop diagnosis completion signal when said diagnosis signal is generated by said second diagnosing means.

7. A diagnostic system as claimed in claim 6
   wherein said controlling means is connected with an engine switch for turning on and off the engine and for producing an engine turn-off signal when said engine switch is in an off state to turn off the engine and an engine turn-on signal when said engine switch is in an on state turning on the engine, and an engine revolution sensor for sensing a revolving condition of the engine and for producing an engine stop signal when said engine is brought to a stop;
   wherein said pressure sensing device is a pressure switch for producing said pressure signal in said atmospheric pressure detection state when the pressure in said control passage is equal to or higher than the predetermined pressure value, and for producing said pressure signal in a vacuum detection state when the pressure in said control passage is lower than said predetermined pressure value;
   wherein said power regulating means includes a means for producing a maximum hold time expiration signal when an elapsed time from generation of said engine stop signal becomes equal to or greater than said maximum hold time, a maximum hold time non-expiration signal when said elapsed time is smaller than said maximum hold time, and a minimum hold time expiration signal when said minimum hold time has elapsed from a stop of the engine;
   wherein said first diagnosing means includes a means for checking said pressure signal of said pressure sensing device if said engine turn-off signal, said engine stop signal, and said maximum hold time non-expiration signal are present and said before-stop diagnosis completion signal is absent, for producing an allowable time expiration signal when said elapsed time from generation of said engine stop signal becomes equal to or greater than said predetermined allowable time, for producing said diagnostic signal in said normality judgment state when said pressure signal is in said atmospheric pressure detection state, for producing said diagnostic signal in said abnormality judgment state when said pressure signal is in said vacuum detection state and said allowable time expiration signal is present, and for producing an after-stop diagnosis completion signal after generation of said diagnostic signal; and
   wherein said power regulating means includes a means for shutting off the supply of electric power to said controlling means when said maximum hold time expiration signal is present without regard to said after-stop diagnosis completion signal, for shutting off the supply of electric power when said maximum hold time non-expiration signal, said after-stop diagnosis completion signal and said minimum hold time expiration signal are all present, and for shutting off the supply of electric power when said maximum hold time non-expiration signal, said before-stop diagnosis completion signal and said minimum hold time expiration signal are all present.

8. A diagnostic system as claimed in claim 1 wherein said intake vacuum introducing means comprises a vacuum tank connected with said selector valve, for supplying the intake vacuum to said selector valve, and a check valve provided in a vacuum introduction passage connecting said vacuum tank to an intake passage of the engine, for limiting fluid flow to a single direction from said vacuum tank to said intake passage; and wherein said predetermined allowable time is equal to or longer than a time required for the vacuum to escape from said vacuum tank.

9. A diagnostic system as claimed in claim 1 wherein said actuator is connected with a swirl control valve disposed in an intake system of the engine, for promoting induction swirl by throttling an intake passage section.

10. A control system comprising:
    an actuator comprising a vacuum working chamber for receiving an intake vacuum of an engine;
    an intake vacuum introducing means for introducing the intake vacuum to said working chamber of said actuator;
    a selector valve connected with said working chamber of said actuator by a vacuum control passage, said selector valve comprising a vacuum introducing valve state for introducing the intake vacuum from said intake vacuum introducing means to said working chamber through said control passage, and an atmospheric pressure introducing valve state for introducing an atmospheric pressure to said working chamber through said control passage;
    a pressure sensing device for sensing a pressure in said control passage between said selector valve and said working chamber of said actuator, and producing a pressure signal which is in an atmospheric pressure detecting signal state when the pressure in said control passage is equal to or higher than a predetermined pressure level, and a vacuum pressure detecting state when the pressure in said control passage is lower than the predetermined pressure level;
    an engine condition sensing means for sensing a condition of said engine, and producing an engine rest signal when the engine is in a predetermined rest state, and an engine run signal when said engine is in a revolving state; and
    a controlling means for generating a valve open command signal to hold said selector valve in said atmospheric pressure introducing valve state upon receipt of said engine rest signal from said engine condition sensing means, producing a first malfunction signal if said pressure signal from said pressure sensing device remains in said vacuum detecting state for a predetermined allowable time after generation of said valve open command signal, and maintaining supply of electric power to said control system for a limited time duration after receipt of said engine rest signal.

11. A control system as claimed in claim 10 wherein said controlling means comprises:

a power regulating means for holding a power supply to said control system in an on state from receipt of said engine rest signal for the limited time duration which is equal to or longer than a predetermined minimum hold time and which is equal to or shorter than a predetermined maximum hold time;

a first diagnosing means for producing said first malfunction signal when said pressure signal remains continuously in said vacuum detecting state for said allowable time after receipt of said engine rest signal; and a second diagnosing means for producing a second malfunction signal when said pressure signal remains continuously in said vacuum detecting state for a predetermined valve opening duration during which said selector valve is held in said atmospheric pressure introducing valve state.

12. A control system as claimed in claim 11 wherein said pressure sensing device is a pressure switch alternating between said atmospheric pressure detecting state and said vacuum pressure detecting state; said engine condition sensing means comprises an engine switch for turning on and off the engine and producing said engine run signal when said engine switch is an on state for holding said engine in said revolving state, and an engine speed sensing means for sensing an engine speed of said engine and producing said engine rest signal when said engine switch is in an off state for turning off said engine and the engine speed is equal to or smaller than a predetermined value; and said controlling means further comprises a selector valve operating means for controlling said selector valve between said vacuum introducing valve state for introducing the intake vacuum and preventing introduction of the atmospheric pressure and said atmospheric pressure introducing valve state in a manner of duty factor control in accordance with the condition of the engine when said engine run signal is present and holding said selector valve in said atmospheric pressure introducing valve state when said engine rest signal is present.

13. A control system as claimed in claim 12 wherein said second diagnosing means includes a means for producing a before-stop diagnosis completion signal if said selector valve is held in said atmospheric pressure introducing valve state for the predetermined valve opening duration while said engine is in the revolving state, and said power regulating means includes a means for shutting off the supply of electric power to said control system at an end of said minimum hold time starting from receipt of said engine rest signal when said before-stop diagnosis completion signal is present, and said minimum hold time is shorter than said allowable time.

* * * * *